Sept. 11, 1962 J. C. WEYMOUTH 3,053,533
FLIGHT CONTROL DEVICE FOR A MODEL AIRPLANE
Filed Sept. 11, 1959 3 Sheets-Sheet 1

INVENTOR.
JACK. C. WEYMOUTH
BY
WILSON, LEWIS & McRAE
ATTORNEYS

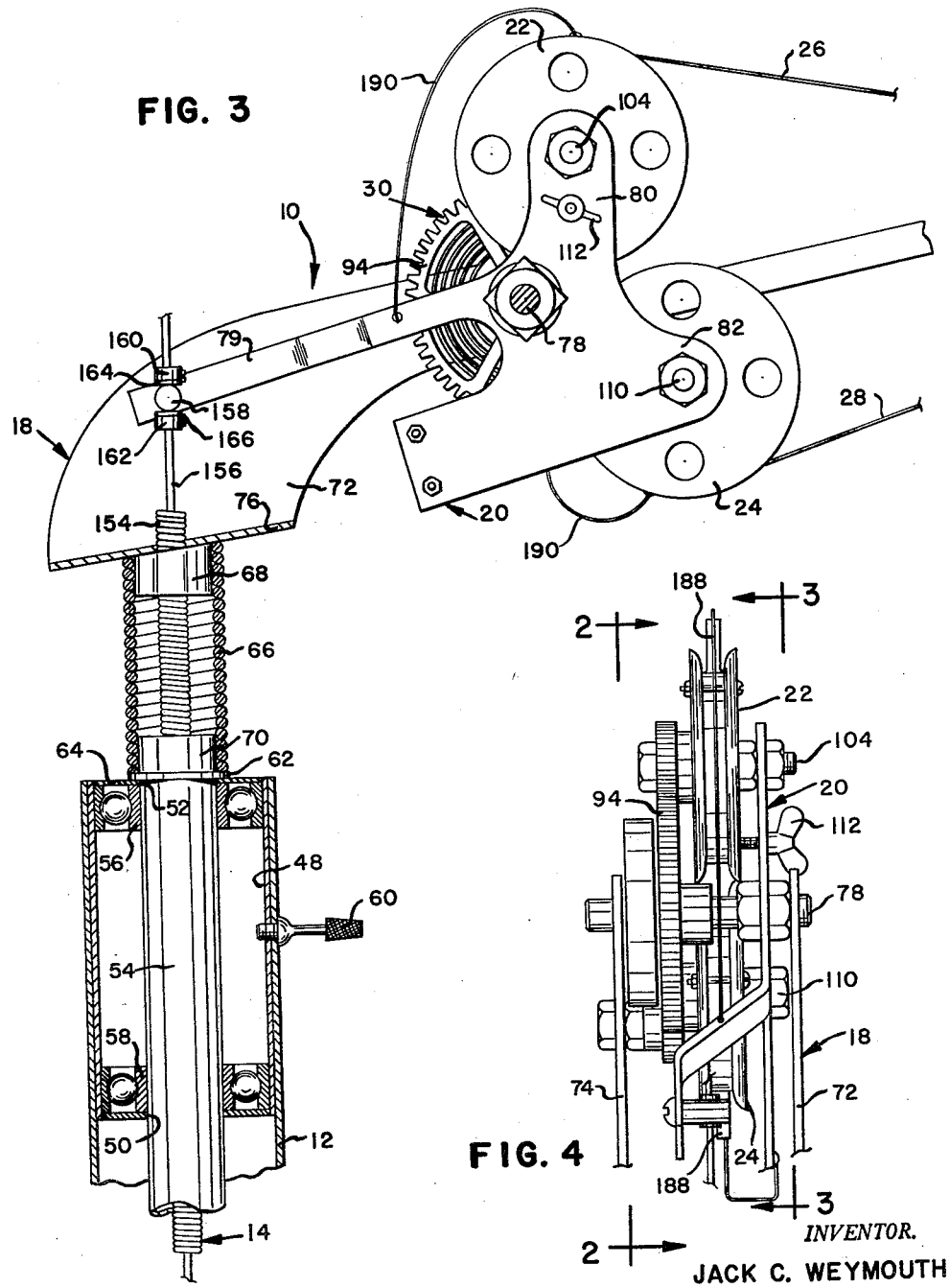

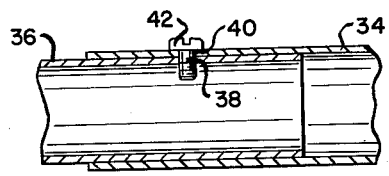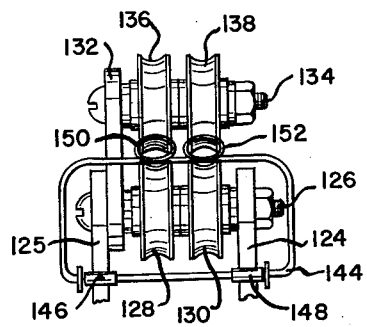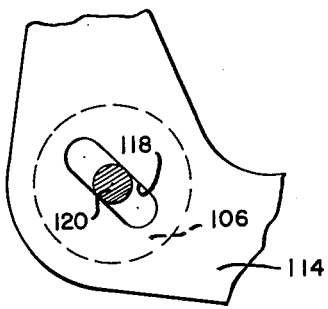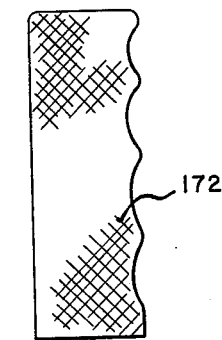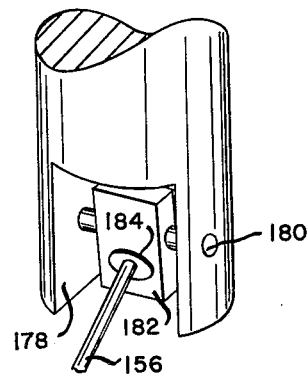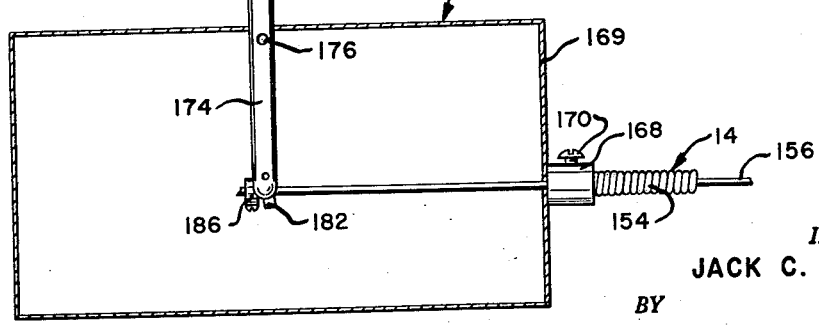

United States Patent Office 3,053,533
Patented Sept. 11, 1962

3,053,533
FLIGHT CONTROL DEVICE FOR A
MODEL AIRPLANE
Jack C. Weymouth, Plymouth, Mich., assignor of
one-half to Rudolph Horvath
Filed Sept. 11, 1959, Ser. No. 839,390
9 Claims. (Cl. 272—31)

This invention relates to a flight control device for a model airplane and more particularly to flight control apparatus for captive model airplanes which permits the operator of the airplane to be positioned outside the airplane flight circle while he is controlling the flight of the airplane.

Captive model airplanes of the type referred to in this specification are those which are controlled in flight by means of a pair of wires secured to the plane and held by the operator. In one conventional system, the wires extend from the operator to the plane wing, pass therethrough and thence through the fuselage to the tail where they control a pair of elevators. Pulling one wire causes the elevators to rise and pulling the other wire causes the elevators to lower, which movements cause the plane to either climb or dive.

There are two principal problems connected with such operation of a model airplane. One is that the operator is located in the center of the flight circle and must turn as the plane circles so that he can constantly observe the plane and keep the control wires taut for fine plane control. This constant turning frequently causes dizziness, which aside from its discomforting effect, may cause the operator to lose control of the plane with a resultant crackup.

The second disadvantage of this type of control is that it requires considerable skill on the part of the operator to correctly adjust the elevators. While the acquisition of this skill is one of the attractions of flying model airplanes, it imposes limitations on flying which are not always desirable.

For example, during the winter season, planes are not usually flown outdoors because of the cold and poor landing conditions. Resort must be had to indoor flying. The large rooms and gymnasiums available for indoor flying are necessarily restricted in the amount of flying room available. The smaller flying space requires that the flight circle be considerably reduced, which in turn requires very sensitive control of the airplane because a small mistake will result in a crash. Additionally, the usual hand control of airplanes limits flying to days when the wind is not very high, as even in the hands of an experienced operator it is very difficult to avoid accidents on windy days.

It is, therefore, an objective of the present invention to provide a flight control device for remotely controlling captive model airplanes.

Another object of the invention is to provide a flight control device which may be operated outside the flight circle of the model airplane.

A further objective is to provide a portable control element which may be readily carried about to permit the operator to move around while controlling the model airplane.

Another object is to provide a control device which does not need special equipment to permit stunting and which may be used with any type or weight of model plane.

A further object is to provide a flight control device which is collapsible and may be disassembled to form a compact portable unit.

A still further object is to provide a flight control device which permits the operator to start the plane motor, launch the plane, and operate the plane in flight without the assistance of a second person.

Another object is to provide a self-winding reel which will automatically wind up the airplane control cables when the operator has finished flying the plane.

Another object is to provide such a flight control device having means to automatically tension the airplane control lines to result in complete control of the airplane even in heavy winds and which also helps to guide the plane into a safe landing after the motor stops.

A further object is to provide a flight control device having two airplane control cables and which has means for readily adjusting the cable length so that an equal length extends from the flight control device at all times.

Another object of the invention is to provide a flight control device having a control cable for remote operation thereof, which cable lies directly on the ground to eliminate entanglement with the airplane when it takes off or lands.

Other objects of this invention will appear in the following description and appended claims, reference being had to the accompanying drawings forming a part of this specification wherein like reference characters designate corresponding parts in the several views.

In the drawings:

FIG. 3 is a side elevational view of the upper portion of the device illustrated in FIG. 1 viewed from the opposite side with reference to FIG. 1.

FIG. 4 is an end elevational view of the upper portion of the device shown in FIG. 1.

FIG. 5 is an end elevational view of the airplane cable guide means.

FIG. 6 is a sectional view of the connection between the base legs and the base taken substantially along line 6—6 of FIG. 1 looking in the direction of the arrows.

FIG. 7 is a sectional view of the control box taken substantially along line 7—7 of FIG. 1 looking in the direction of the arrows.

FIG. 8 is an enlarged view in perspective of the connection between the control handle shown in FIG. 7 and its associated operating rod.

FIG. 9 is a segmental view showing the mounting of the adjustable pinion illustrated in FIG. 2.

Figure 1:
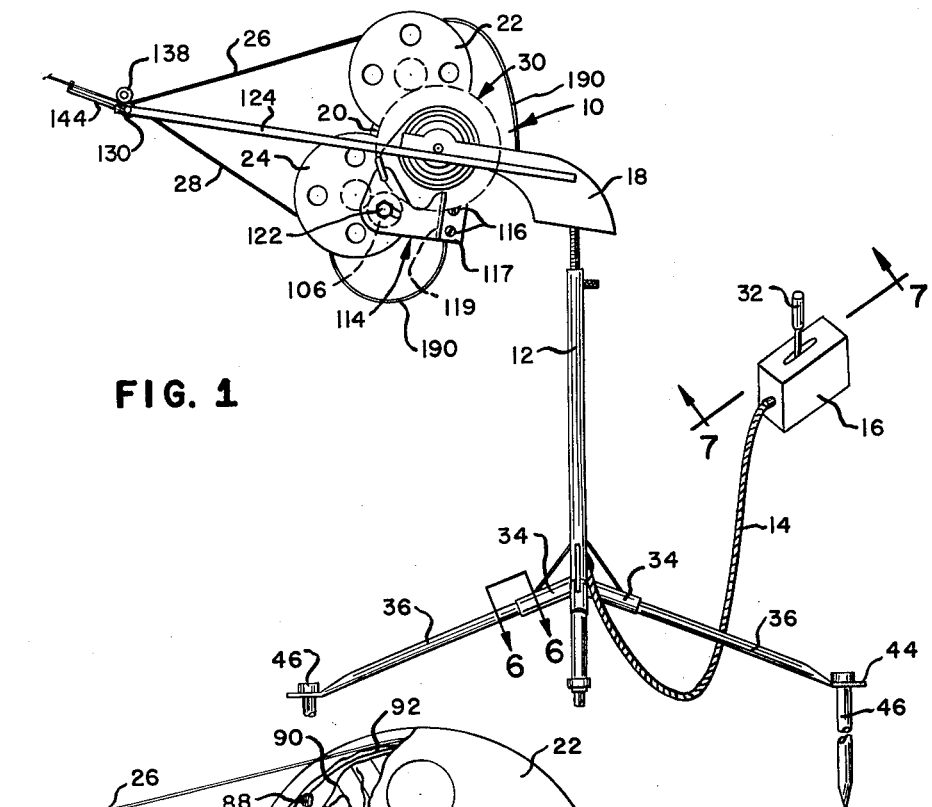
FIG. 1 is a side elevational view of one embodiment of the flight control device of the present invention.

Before explaining the present invention in detail, it it to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As may be seen in the drawings, the flight control device 10 includes a hollow upright post element 12 supported on a tripod. Motion transmitting means consisting of a Bowden cable 14 extend from a control box 16 to an opening in the lower end of the post 12 to pass therethrough and terminate at a point thereabove. A freely rotatable bracket 18 is carried on the upper end of the post 12. A rockable member 20, which is mounted in the bracket means 18, carries a pair of reels 22, 24. An airplane control cable 26, 28 is connected to each reel 22, 24 and is connectable at the other end to a model airplane (not shown). During the flight of an airplane the bracket 18 is pulled by the cables 26, 28 and rotates in a circle to follow the flight circle of the plane. As previously mentioned, the cables 26, 28 normally extend through the plane wing and thence through the fuselage to the tail where they control the operation of a pair of elevators. Pulling one cable causes the elevators to rise and pulling the other cable causes the elevators to lower, which movements cause the plane to climb and dive. The desired tension in the cables 26, 28 is maintained by tensioning means 30 which always tend to rotate the reels 22, 24 to wind the cables in. A pivotal control handle 32 is provided in the control box 16 and is connected to the Bowden cable 14. Pivotal movement of the handle 32 is transmitted to the rockable member 20 via the Bowden cable and causes the member 20 to pivot with consequent pivoting of the reels 22, 24 to selectively vary the relative position of the reels with respect to the bracket 18. This movement effectively lengthens or shortens the airplane cables 26, 28 with the result of either lowering or raising the elevators in the plane. As may be readily appreciated, actuation of the handle 32 will thus cause the model airplane to climb or dive as desired.

Referring more specifically to the drawings, it may be seen in FIG. 1 and 6 that the hollow upright post element 12 is provided with socket elements 34 at its lower end to detachably receive ground engaging legs 36 to form a tripod structure. The legs 36 are each provided with a threaded opening 38 which registers with an unthreaded opening 40 in each of the sockets 34. The legs are each detachably secured in place by a screw 42 which extends through the socket opening 40 into engagement with the threaded leg opening 38. The tripod structure is secured in place on the ground by stakes 46 which extend through openings provided in the feet 44 of the legs 36.

The hollow post 12 has an opening adjacent the lower end for insertion of the Bowden cable 14. The cable 14, is preferably secured to the post 12 at this point to prevent pulling of the cable and applying tension on its connection with the rockable member 20.

The upper end of the post 12 is open to receive the shaft and bearing assembly which supports the bracket 18. The shaft and bearing assembly comprises a cylindrical housing 48 having an opening 50, 52 at each end through which a hollow shaft 54 extends. The shaft 54 is rotatably supported within the housing by means of bearings 56, 58. The housing 48 is detachably secured to the post 12 by means of a thumb screw 60 which extends through an opening in the post and threadingly engages a threaded opening provided in the housing. The shaft 54 has an annular flange 62 at its upper end which abuts against the upper end plate 64 of the housing 48 to give a vertical bearing support to the shaft.

A flexible neck portion 66 is secured to the upper end of the shaft 54. The neck 66 comprises a flexible hollow casing consisting of a plurality of wire convolutions. While the neck 66 has the appearance of a spring, it does not operate as a spring as the wire convolutions are secured together and it is thus not compressible nor expandable. Support members 68, 70 are secured within the neck 66 at each end thereof. They may be secured in place by brazing or welding. The lower end of the neck 66 is secured to the annular flange 62 and may be brazed in place. The upper end of the neck 66 is secured to and supports the bracket 18.

The function of the flexible neck 66 is to provide a resilient mounting for the bracket 18. It sometimes occurs while flying a model airplane that the plane exerts a sharp pull on the cable 26, 28. The provision of a flexible mounting for the bracket 18 avoids the possibility of breaking the cables or damaging the working parts of the device.

Figure 2:
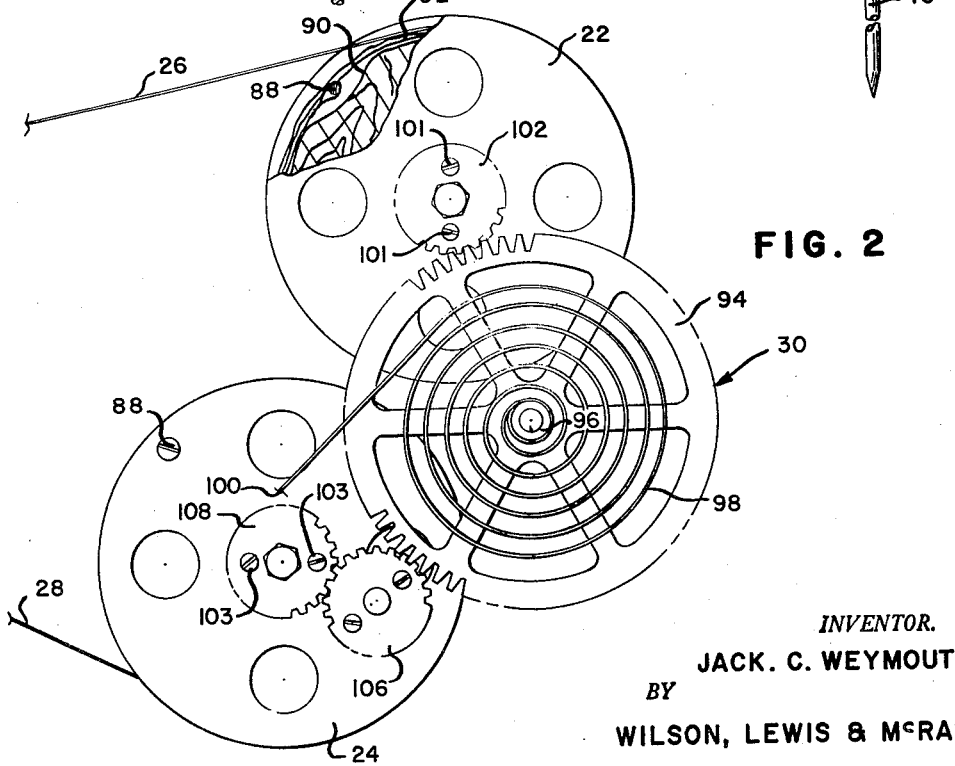
FIG. 2 is a side elevational view of the airplane control cable reels and tensioning means therefor utilized in the FIG. 1 embodiment with parts removed for the purpose of clarity.

The bracket support 18 consists of two spaced arms 72, 74 which are interconnected by the web member 76 which is secured to the neck 66. Extending between the arms 72, 74 adjacent the outer end thereof is a shaft 78 on which the rockable member 20 is rotatably mounted. The member 20 has one lever arm 79 extending from the shaft 78 to a point directly above the neck 66. The member 20 also has a pair of angularly disposed arms 80, 82 which extend in opposite directions from the shaft 78. Reels 22, 24 are rotatably mounted on shafts 104, 110 which are secured to the angularly disposed arms 80, 82. Each reel 22, 24 is provided with a peripheral groove for winding the airplane control cables 26, 28. As may be seen in FIG. 2, a detachable bolt 88 extends through the side of each reel to form a rod for securement of the airplane control cable. A depression 90 is formed beneath each bolt 88 whereby the upper peripheral edge of the bolt is even with the bottom 92 of the reel groove. In this manner, the cable extends from the bolt 88 at substantially the same level as the groove bottom 92, which avoids the formation of a hump in the wound cable. Such a hump would cause uneven winding of the cable whereby the two reels 22, 24 would dispense unequal amounts of cable when rotated an equal number of times. It is desirable to correlate the two reels 22, 24 so that they will dispense the same amount of cable or will wind up the same amount of cable to the end that the two cables will always be extended an equal length.

Also rotatably mounted on the shaft 78 adjacent the rockable member 20 is a spring-loaded gear 94 forming a part of the tensioning means 30. The gear 94 has a hub 96 to which is secured the inner end of a coil spring 98. The outer end 100 of the spring 98 is secured to the arm 74 of the bracket 18. The gear 94 meshes with a pinion gear 102 fixedly mounted on the reel 22 by screws 101. The spring-loaded gear 94 also meshes with a second adjustable pinion gear 106 which in turn meshes with a pinion gear 108 fixedly mounted on the second reel 24 by screws 103. The spring-loaded gear 94 tends to rotate the reel 22, 24 and wind-up the cables 26, 28 to thereby apply a constant tension to the cables when an airplane is in flight. This feature keeps the cables taut to permit sensitive control of the model airplane. For example, if a wind blows the airplane towards the flight control device 10, slack will develop in the cables 26, 28. This slack will be immediately taken up by rotation of the reels 22, 24 to again establish the desired tension. In addition to this function, after the operator is through flying the model airplane, the tensioning device 30 will automatically rotate the reels 22, 24 to provide a convenient method for winding-up the extending cable. The coil spring 98 is, of course, always wound-up when the reels 22, 24 are rotated to dispense a length of cable 26, 28.

As may be noted in FIGS. 3 and 4, a thumb screw 112 threadedly engages an opening in the arm 80 of the rockable member 20 and extends inwardly towards the reel 22. The screw 112 may be threaded into engagement with the reel 22 to act as a stop to prevent rotation of the reels during periods of non-use or during periods when it is desired to even out the length of cable extending from the reels.

When it is desired to even out the length of cable extending from the reels, the intermediate pinion 106 may be disengaged to permit free rotation of the reel 24. As may be noted in FIGS. 1 and 9, the intermediate pinion 106 is mounted on a support element 114 which is secured to the rockable element 20 by bolts 116 which pass through the flange 117 of a laterally extending web element 119. A slot 118 is provided in the support 114 to slidably receive the shaft 120 which carries the pinion 106. In operation, the shaft 120 is moved in the slot 118 until the pinion 106 engages the spring driven gear 94 and also the pinion 108. The securing nut 122 is then tightened and the pinion 106 is maintained in engaging position. When the airplane cables 26, 28 are to be evened up, the nut 122 is loosened and the shaft 120 moved in the slot 118 until the pinion 106 disengages its respective gears whereupon the reel 24 may be rotated to lengthen or shorten the cable.

As may be noted in FIGS. 1 and 5, means are provided to guide the airplane cables 26, 28 from the reels towards the model airplane. A pair of guide arm extensions 124, 125 are provided on the arms 72, 74 of the bracket 18. Secured between the outer ends of the arms 124, 125 is a shaft 126 upon which is mounted spaced pulleys 128, 130. Also mounted on the shaft 126 is a support member 132 which carries a second shaft 134. A second pair of spaced pulleys 136, 138 are mounted on the shaft 134. Each of the pulleys 136, 138 is aligned with one of the pulleys 128, 130 and in peripheral engagement therewith whereby openings are provided therebetween to guide the airplane cable from the reels and through the pulleys. A rectangular ring element 144 is pivotally mounted in front of the pulleys by means of bearings 146, 148 secured thereto a pair of spaced eyelets 150, 152 through which the cables 26, 28 extend. The ring and pulley combination keeps the airplane cables spaced and free from entanglement.

Movement of the rockable member 20 to adjust the position of the reels 22, 24 is effectuated by the control box 16 through the flexible operator 14. The flexible operator 14 which is illustrated as being a Bowden cable, consists of a flexible casing 154 through which extends a pull cable 156. The pull cable 156 is connected at one end to the arm 79 of rockable member 20. As may be noted in FIG. 3, the pull cable extends through an opening in rod 158, which is secured to the outer end of the arm 79. The pull cable 156 is secured in place by locking collars 160, 162 which are spaced from the rod 158 by washers 164, 166.

The remote end of the pull cable 156 extends into the control box 16, through hollow projection 168 provided on the end wall 169. The cable 14 is held in place by means of a set screw 170. The operating handle 32, which comprises a handle portion 172 and an operating rod 174, is pivotally mounted at 176 to the box 16. The lower end of the rod 174 is provided with a notch 178 through which extends a transverse rod 180. The rod 180 carries a rotatable block 182 to which the pull cable 156 is secured. The cable 156 is held in place by an annular flange 184 which may be a washer brazed to the cable, and which abuts against one side of the block 182. A detachable locking collar 186 is provided on the other side of the block 182 whereby the cable may be removed if desired.

As may be seen in FIGS. 1, 3 and 4, holding means may be provided to keep the airplane cables 26, 28 seated in the reels 22, 24. The holding means comprise a member 188 which is held against the wire in the reel by a spring element 190 which is secured to the rockable member 20. The member 188 is preferably fabricated from a soft material such as felt. The holding means are particularly useful for the instance where one cable is suddenly slackened, with the resultant tendency to jump out of the reel.

In operation, pulling the handle 172 to the left as viewed in FIG. 7 will tend to push the pull cable 156 forward. This motion will be transmitted to the arm 79 of the rockable member as an upward force tending to rock this member in the clockwise direction as viewed in FIG. 3. Clockwise motion will move the reel 24 to the left and the reel 22 to the right. This motion will pull the airplane cable of reel 24 and slacken the cable of reel 22. This motion will be transmitted to the airplane elevators to either raise or lower the elevators as the case may be.

The airplane control device may be readily collapsed to a compact portable unit by detaching the legs 36 from the post 12, detaching the Bowden cable 14 from the control box and rockable member 20, and then removing the housing 48 from the upper end of the post 12. The component parts may then be placed in a box or the like and stored until reassembled for further use.

Having thus described my invention, I claim:

1. A flight control device for a model airplane comprising a base structure, rotatable bracket means carried on the base, a rockable member mounted on the bracket means, a pair of reels mounted on the rockable member, airplane control cables each connected at one end to a separate reel and connectable at the other end to an airplane, tensioning means connected to said reels tending to rotate the reels whereby to apply tension to the airplane control cables, a pivotable control handle remotely disposed from said base, and motion transmitting means interconnecting the control handle and said rockable member whereby said reels may be rocked to selectively vary the position of the reels with respect to the bracket means.

2. A control device for a model airplane comprising a base structure including an upstanding hollow post, rotatable bracket means carried on the post, a rockable member mounted on said bracket means, a pair of reels mounted on the rockable member, airplane control cables each connected at one end to a separate reel and connectable at the other end to an airplane, tensioning means connected to said reels tending to rotate the reels whereby to apply tension to the airplane control cables, a pivotable control handle disposed remotely from said hollow post, a Bowden cable secured at one end to the control handle and extending upwardly through said hollow post to a connection with the rockable member whereby to selectively adjust the position of said reels to vary the position thereof with respect to the bracket means.

3. A flight control device for a model airplane comprising a base structure including an upright post element, freely rotatable bracket means carried on the post, a rockable member mounted on said bracket means, a pair of reels mounted on the rockable member, an airplane control cable connected to each of said reels at one end and connectable at the other end to an airplane, tensioning means connected to said reels tending to rotate the reels whereby to apply tension to the airplane control cables, a pivotable control handle remotely disposed from said post, and motion transmitting means interconnecting the control handle and the rockable member whereby said reels may be rocked to selectively vary the relative position of the reels with respect to the bracket means.

4. A model airplane remote control apparatus comprising a base including an upright post element, a freely rotatable laterally flexible support element carried on the upper end of the post, bracket means on the upper end of the flexible support element, a rockable member mounted on said bracket means, a pair of reels mounted on the rockable member, airplane control cables each connected at one end to a separate reel and connectable at the other end to an airplane, tensioning means connected to said reels tending to rotate the reels whereby to apply tension to the airplane control cables, a pivotable control handle remotely disposed from said post, and motion transmitting means interconnecting the control handle and said rockable member whereby said reels may be rocked to selectively vary the relative position of the reels with respect to the bracket means.

5. A flight control device for a model airplane comprising an upright post element having socket elements at its lower end, ground engaging legs detachably secured in said sockets, freely rotatable bracket means detachably secured on the upper end of the post, a rockable member mounted on said bracket means, a pair of reels mounted on the rockable member, airplane control cables each connected at one end to a separate reel and connectable at the other end to an airplane, tensioning means connected to said reels tending to rotate the reels whereby to apply tension to the airplane control cables, a pivotable control handle remotely disposed from said post, and flexible operator means detachably connected at one end to the rockable member and detachably connected at the other end to the control handle, said flexible operator being effective to adjust the position of the rockable member whereby said reels may be rocked to selectively vary the relative position of the reels with respect to the bracket means.

6. A device as claimed in claim 5 and further characterized in that said flexible operator is a Bowden cable.

7. A flight control device for a model airplane comprising an upright post element, freely rotatable bracket means carried on the post, a rockable member mounted on said bracket means, first and second reels mounted on the rockable member, a pair of airplane control cables each connected at one end to a separate one of said reels and connectable at the other end to an airplane, tensioning means connected to said reels tending to rotate the reels whereby to apply tension to the airplane control cables, said tensioning means comprising a spring-driven gear, a pinion gear drivingly connected with said first reel and directly engaged with said spring-driven gear, a second pinion gear drivingly connected with said second reel, a third pinion gear engaged with said second pinion gear and with said spring-driven gear, said third pinion gear being disengageable from said second pinion gear whereby said second reel may be disconnected from engagement with the tensioning means to permit free rotation of said second reel to adjust the length of the airplane control cable extending therefrom, a pivotable control handle remotely disposed from the post element, and motion transmitting means interconnecting the control handle and said rockable member whereby said reels may be rocked to selectively vary the relative position of the reels with respect to the bracket means.

8. A control device for a model airplane comprising an upright post element having socket elements at its lower end, ground engaging legs detachably receivable in said socket elements, a freely rotatable shaft member detachably secured on the upper end of the post, a laterally flexible support element carried on the upper end of said shaft member, bracket means carried on the flexible support element, a rockable member mounted on said bracket means, a pair of reels mounted on the rockable member, a pair of airplane control cables each connected at one end to a separate one of said reels and connectable at the other end to an airplane, tensioning means connected to said reels tending to rotate the reels whereby to apply tension to the airplane control cable, a pivotable control handle remotely disposed from said post, and flexible motion transmitting means interconnecting the control handle and said rockable member whereby said reels may be rocked to selectively vary the relative position of the reels with respect to the bracket means.

9. A device as claimed in claim 8 and further characterized in that said upright post element, shaft member and flexible support element are hollow and said flexible motion transmitting means comprises a Bowden cable detachably secured at one end to the control handle and extends upwardly within said post element through said shaft member and flexible support element to a detachable connection with the rocketable member.

References Cited in the file of this patent

UNITED STATES PATENTS

| | | |
|---|---|---|
| 2,390,307 | Kelecius | Dec. 4, 1945 |
| 2,825,562 | Clarkson | Mar. 4, 1958 |
| 2,913,243 | Cottle | Nov. 17, 1959 |
| 2,913,244 | Cottle | Nov. 17, 1959 |

UNITED STATES PATENT OFFICE
CERTIFICATE OF CORRECTION

Patent No. 3,053,533                            September 11, 1962

Jack C. Weymouth

It is hereby certified that error appears in the above numbered patent requiring correction and that the said Letters Patent should read as corrected below.

Column 5, line 18, before "thereto" insert -- to the extensions 124, 125. The ring 144 has secured --.

Signed and sealed this 5th day of February 1963.

(SEAL)
Attest:

ERNEST W. SWIDER
Attesting Officer

DAVID L. LADD
Commissioner of Patents